US012689937B2

(12) United States Patent
Zhu et al.

(10) Patent No.: US 12,689,937 B2
(45) Date of Patent: Jul. 21, 2026

(54) SYSTEMS AND METHODS FOR CONDITIONAL SERVICE LEVEL ENFORCEMENT

(71) Applicant: Verizon Patent and Licensing Inc., Basking Ridge, NJ (US)

(72) Inventors: Lily Zhu, Parsippany, NJ (US); Cindy Yuexin Dong, Bridgewater, NJ (US)

(73) Assignee: Verizon Patent and Li licensing Inc., Basking Ridge, NJ (US)

( * ) Notice: Subject to any disclaimer, the term of this patent is extended or adjusted under 35 U.S.C. 154(b) by 354 days.

(21) Appl. No.: 18/308,145

(22) Filed: Apr. 27, 2023

(65) Prior Publication Data

US 2024/0365162 A1     Oct. 31, 2024

(51) Int. Cl.
H04W 28/02     (2009.01)
H04W 24/08     (2009.01)

(52) U.S. Cl.
CPC ....... H04W 28/0268 (2013.01); H04W 24/08 (2013.01); H04W 28/0278 (2013.01)

(58) Field of Classification Search
None
See application file for complete search history.

(56) References Cited

U.S. PATENT DOCUMENTS

| | | | | |
|---|---|---|---|---|
| 11,843,983 B1 * | 12/2023 | Marupaduga | ....... | H04W 36/087 |
| 2016/0073428 A1 * | 3/2016 | Vutukuri | ........... | H04W 72/1215 |
| | | | | 370/329 |
| 2016/0295442 A1 * | 10/2016 | Virtej | ..................... | H04W 72/21 |
| 2020/0076709 A1 * | 3/2020 | Stenberg | ............. | H04L 67/1008 |
| 2021/0168053 A1 * | 6/2021 | Xu | ..................... | H04L 41/5051 |
| 2022/0167355 A1 * | 5/2022 | Andrews | ................. | H04L 47/80 |
| 2022/0417729 A1 * | 12/2022 | Cai | ........................ | H04W 36/13 |
| 2023/0246900 A1 * | 8/2023 | Zhang | ................... | H04L 41/044 |
| | | | | 709/223 |
| 2023/0309164 A1 * | 9/2023 | Xu | ........................ | H04W 28/26 |
| 2023/0319611 A1 * | 10/2023 | Lin | ....................... | H04W 24/08 |
| | | | | 370/252 |
| 2024/0155478 A1 * | 5/2024 | Gandikota | .............. | H04L 45/64 |

* cited by examiner

*Primary Examiner* — Xavier S Wong

(57)     ABSTRACT

A method may include providing data services to a user equipment (UE) device via a first network slice and determining a data throughput threshold associated with the first network slice. The method may also include determining if the UE device has exceeded the data throughput threshold over a first period of time. The method may further include providing data services to the UE device via a second network slice, in response to determining that the UE device has exceeded the data throughput threshold over the first period of time.

20 Claims, 5 Drawing Sheets

SYSTEMS AND METHODS FOR CONDITIONAL SERVICE LEVEL ENFORCEMENT

BACKGROUND INFORMATION

Network slices often provide differentiated services to particular applications and/or users. For example, one network slice may be associated with a service level agreement (SLA) that guarantees low latency and jitter to various users/applications. However, problems occur at higher data throughputs when the low latency/low jitter applications consume most or all of the bandwidth and network resources of the network slice. For example, users of other applications may be negatively impacted by the differentiated services users that are provided with the low latency and low jitter SLA.

DETAILED DESCRIPTION OF EXAMPLE EMBODIMENTS

The following detailed description refers to the accompanying drawings. The same reference numbers in different drawings may identify the same or similar elements.

Implementations described herein provide conditional differentiated services, such as a conditional SLA and/or Quality of Service (QOS) based on various factors. For example, a network device may measure actual data throughput for a particular network slice providing differentiated services to users. If the demand associated with a user exceeds an advertised supported data rate (e.g., uplink and/or downlink data rates) for the slice, the radio access network (RAN) and/or the core network may remove the special treatment associated with the SLA and/or QoS for the user device that is provided via the particular network slice. For example, the RAN and/or core network may effectively remove an SLA, QoS, priorities and/or weighting factors for the user device, and provide the user device with services via a default network slice.

When the measured demand associated with the user device falls below the advertised supported data rate for the slice, the RAN and/or core may reapply the differentiated services/special treatment (e.g., the SLA and/or QoS) for the user device via the original network slice. In this manner, differentiated services associated with a particular SLA and/or QoS may be dynamically applied and removed for various user devices based on actual data throughput and data demand from a user device. This dynamic application of the special service level treatment may allow the network service provider to provide differentiated services to users based on the particular network conditions and the data throughput demand, while ensuring that other network slices have adequate resources to service other users.

Figure 1:
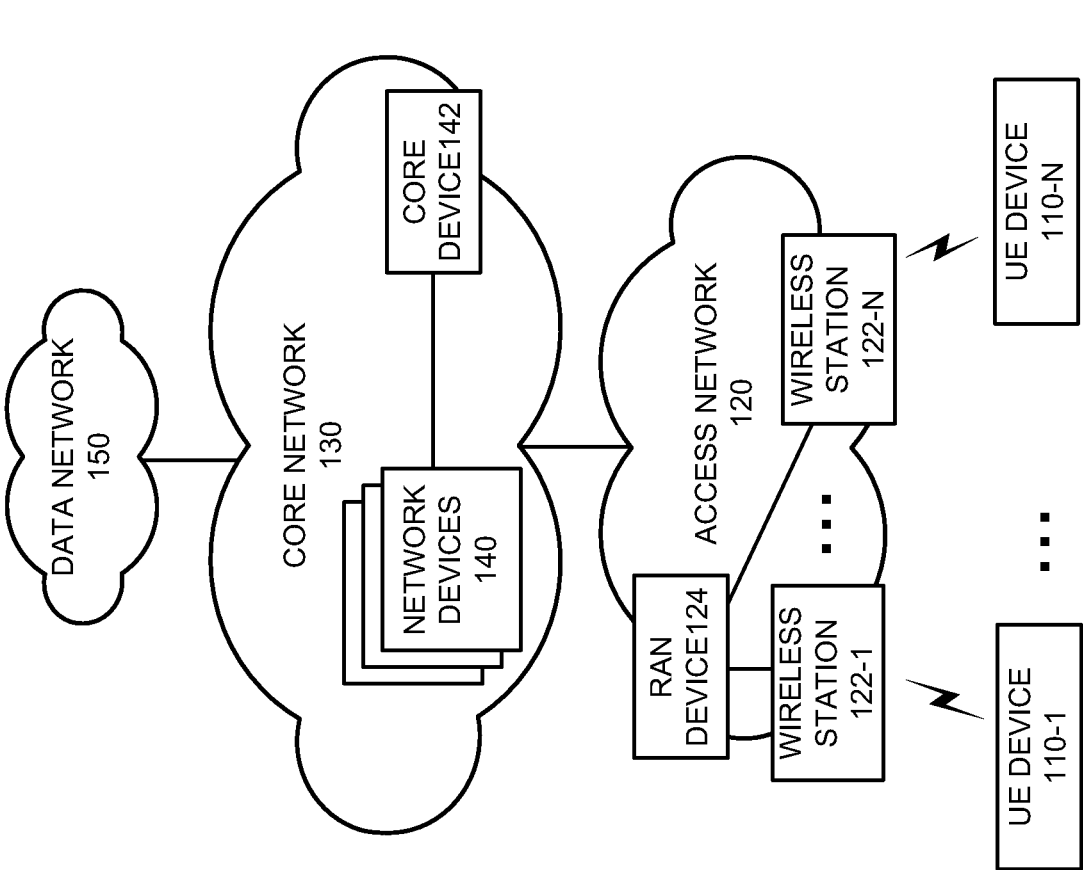
FIG. 1 illustrates an exemplary environment in which systems and methods described herein may be implemented.
Figure 1:

FIG. 1 is a diagram illustrating an exemplary environment 100 in which systems and methods described herein may be implemented. Referring to FIG. 1, environment 100 includes user equipment (UE) devices 110-1 through 110-N, access network 120 (also referred to herein as radio access network (RAN) 120), wireless stations 122-1 through 122-N, RAN device 124, core network 130, network devices 140, core device 142 and data network 150.

In accordance with an exemplary implementation, environment 100 may support differentiated services for UEs 110 via network slices, such as data services associated with particular SLAs and or QoS requirements. The term "network slice" or "slice" as used herein refers to a logical network including a portion of an access network (e.g., a portion of RAN 120), a portion of a transport network (not shown in FIG. 1) and/or a portion of a core network (e.g., a portion of core network 130) that provides telecommunication services and network capabilities that can vary from slice to slice. Each network slice may be associated with a different type of service having different characteristics and requirements (e.g., latency, jitter, bandwidth, etc.). A service provider may provision network slices to UE devices 110 to provide network connectivity and data services for UE devices 110, as described in detail below.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a Chromebook®, a mobile device such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, an Internet of Things (IoT) device, a machine type communication (MTC) device, etc., that includes communication functionality. UE device 110-1 may connect to access network 120 via wireless station 122-1 and UE device 110-N may connect to access network 120 via wireless station 122-N. UE devices 110 may also connect to other devices in environment 100 via other techniques, such as wired, wireless, optical connections or a combination of these techniques. UE device 110 and a person that may be associated with UE device 110 (e.g., the party holding or using UE device 110) may be referred to collectively as UE device 110 or UE 110 in the description below.

Access network 120 may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. For example, access network 120 may include the functionality of a 5G network, such as 5G RAN communicating via mmWave technology, a 5G RAN communicating via C-band technology or other types of 5G networks. Access network 120 may also include a 4G RAN.

Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include a 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNodeB)) or a sixth generation (6G) base station that communicates wirelessly with UEs 110 located within the radio frequency range of wireless station 122.

RAN device 124 may include one or more devices including logic to aid in enforcing various differentiated services in environment 100. For example, RAN device 124 may determine actual data throughput associated with particular UEs 110 and determine whether the particular UEs 110 are complying with an agreed upon traffic profile for a particular network slice, such as an agreed upon uplink and/or downlink data throughput. In instances where a particular UE 110 is exceeding agreed upon data usage parameters for a slice, RAN device 124 may remove the special treatment (e.g., low latency, low jitter) provided via the network slice. In other implementations, RAN device 124 may signal core network 130 to determine whether to remove the special services treatment, as described in detail below. In FIG. 1, RAN device 124 is shown being located externally with respect to wireless stations 122. However, in other implementations, RAN device 124 may be co-located and/or implemented within wireless stations 122.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC)

network for a 5G network, an Evolved Packet Core (EPC) of an LTE or LTE Advanced network, a 6G network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an Access and Mobility Management Function (AMF), a Session Management Function (SMF), a Unified Data Management (UDM) function, a Unified Data Repository (UDR), a Network Repository Function (NRF), a Policy Control Function (PCF), a Charging Function (CHF), a Network Exposure Function (NEF), an Application Function (AF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementation, network devices 140 may include combined 4G and 5G functionality, such as a session management function with PGW-control plane (SMF+PGW-C) and a user plane function with PGW-user plane (UPF+PGW-U).

Core device 142 may include one or more devices including logic to aid in enforcing various differentiated services in environment 100. For example, similar to RAN device 124, core device 142 may measure and/or obtain actual data throughput associated with particular UEs 110 and determine whether the particular UEs 110 are complying with an agreed upon traffic profile for a particular network slice. In other instances, core device 142 may receive a notification from, for example, RAN device 124 indicating that a particular UE 110 is not complying with an agreed upon traffic profile. In instances where a particular UE 110 is exceeding agreed upon data usage parameters or other agreed upon profile parameters, core device 142 may remove the special treatment (e.g., low latency, low jitter) provided via the network slice, as described in more detail below.

In accordance with an exemplary implementation, access network 120 and core network 130 may provide differentiated services to different applications/users via network slices. The term "differentiated services" as used herein should be broadly construed to include services associated with one or more of an SLA, QOS, various key performance indicators (KPIs), QoS Class Identifier (QCI) enforcement, etc.

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple access networks 120, core networks 130 RAN devices 124, core devices 142, and data networks 150. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
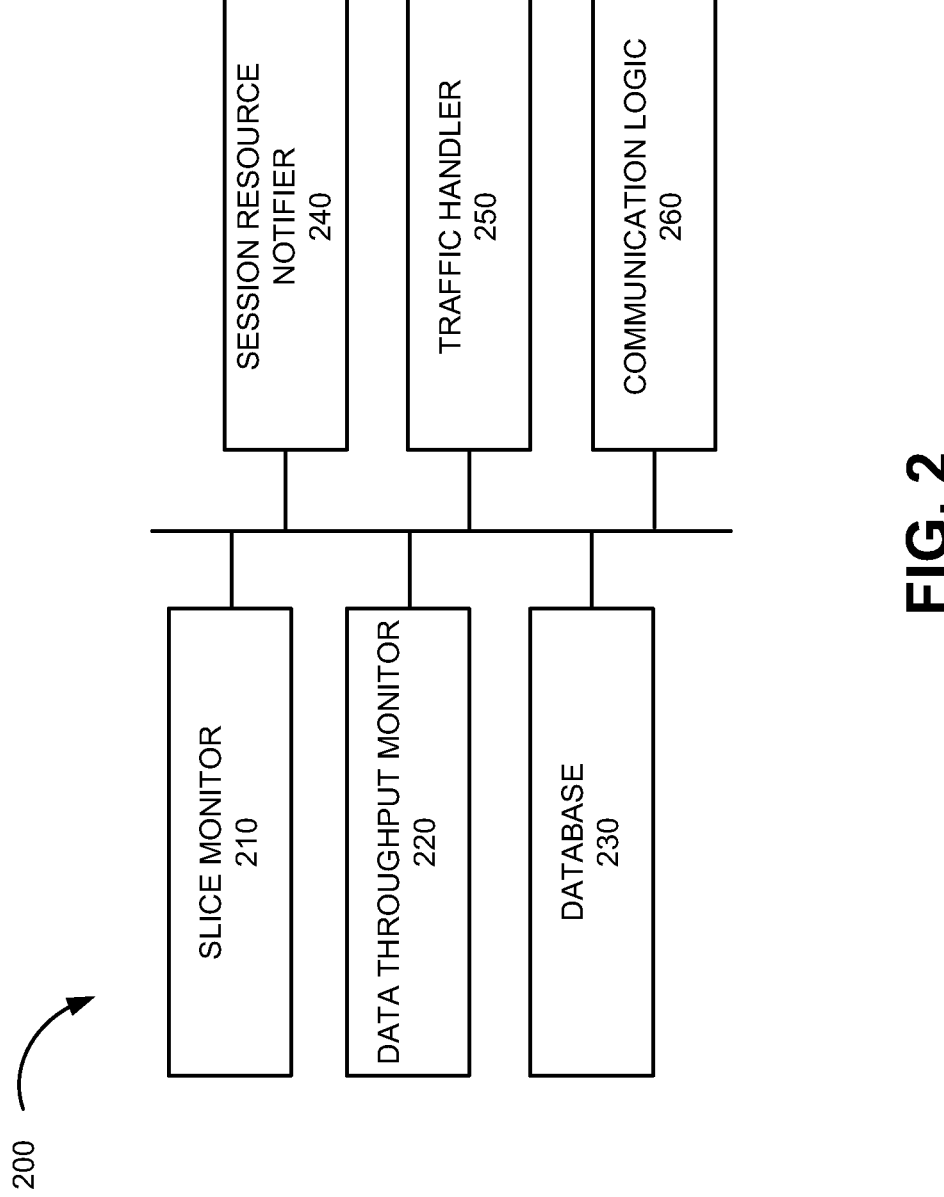
FIG. 2 is a block diagram of components implemented in one or more of the elements of FIG. 1 in accordance with an exemplary implementation.

FIG. 2 is a block diagram of device 200 implemented in environment 100 in accordance with an exemplary implementation. One or more devices 200 may be implemented in RAN device 124 and core device 142. In other implementations, device 200 may be implemented in other elements of environment 100, such as wireless stations 122, a network function (e.g., one of network devices 140) included in core network 130, etc. Referring to FIG. 2, device 200 includes slice monitor 210, data throughput monitor 220, database 230, session resource notifier 240, traffic handler 250 and communication logic 260.

Slice monitor 210 may include logic to monitor slices implemented in environment 100. For example, slice monitor 210 may identify slices that provide differentiated services, such as a particular SLA, QOS, KPIs, QCI, etc. For example, one slice may be associated with an SLA corresponding to a particular low latency and low jitter, such as a round trip latency of 20 milliseconds (ms) or less and a jitter variation of 5 ms or less. In other implementations, slice monitor 210 may identify slices having a high bandwidth and low latency, a slice having a medium bandwidth with fast convergence and low jitter, etc. In an exemplary implementation, each slice may be identified by a slice identifier (ID). The slice ID may correlate to the particular SLA, QOS, priority and/or other metrics or profile associated with the slice.

Data throughput monitor 220 may monitor actual data throughput associated with slices implemented in environment 100. For example, data throughput monitor 220 may generate time windows, such as a time window of 5 seconds, 30 seconds, one minute, etc., in which the data throughput for particular slices is measured. As an example, data throughput monitor 220 may measure both uplink throughput and downlink throughput for UEs 110 serviced by a particular slice. The data throughput for each UE 110 may then be compared to data throughput thresholds associated with the particular slices stored in, for example, database 230.

Database 230 may store slice IDs and corresponding SLAs, QoS requirements, KPIs, priority information, etc., associated with the slices. For example, database 230 may store a slice ID, along with SLA and/or QoS requirements, such as low latency and low jitter SLA, as well as particular profiles including, for example, bandwidth thresholds for each slice used in environment 100. As additional slices are added in environment 100, database 230 may be dynamically updated to include the particular information for the newly added slices.

Session resource notifier 240 may include logic to provide notifications based on the measured data throughput. For example, session resource notifier 240 may determine if a particular UE 110 has exceeded data throughput thresholds and/or receive information indicating that the measured data throughput has exceeded the thresholds for a particular slice. If the data throughput threshold(s) has been exceeded, session resource notifier 240 may signal other devices in environment 100 to determine whether to remove the differentiated services handling for the UE 110.

Traffic handler 250 may include logic to determine whether to remove differentiated services treatment for UEs 110. For example, if data throughput monitor 220 determines that a particular UE 110 has exceeded upload and/or download traffic profiles associated with a particular slice, traffic handler 250 may determine that the differentiated services handling will be removed for that UE 110. When the data throughput/demand from the particular UE 110 falls below the threshold/traffic profile (as measured by data throughput monitor 220), traffic handler 250 may reapply differentiated services treatment for the UE 110.

Communication logic 260 may include logic for communicating with devices in environment 100 via wired, wireless or optical mechanisms. For example, communication logic 260 may transmit data, such as notifications from session resource notifier 240 to other devices in environment 100, such as to core network 130. Communication logic 260 may also receive information from devices in environment 100, such as devices in core network 130 providing information indicating whether to apply or remove special services handling for traffic in environment 100. Communication logic 260 may include one or more transceivers and one or more antennas for transmitting and receiving RF data, a modem or an Ethernet interface to a LAN or other mechanisms for communicating with elements in a network.

Although FIG. 2 shows exemplary components of device 200, device 200 may include fewer components, different components, differently arranged components, or additional components than depicted in FIG. 2. In addition, in other implementations, some or all of the components illustrated in FIG. 2 may be implemented in other devices, such as one or more devices implemented in core network 130.

Figure 3:
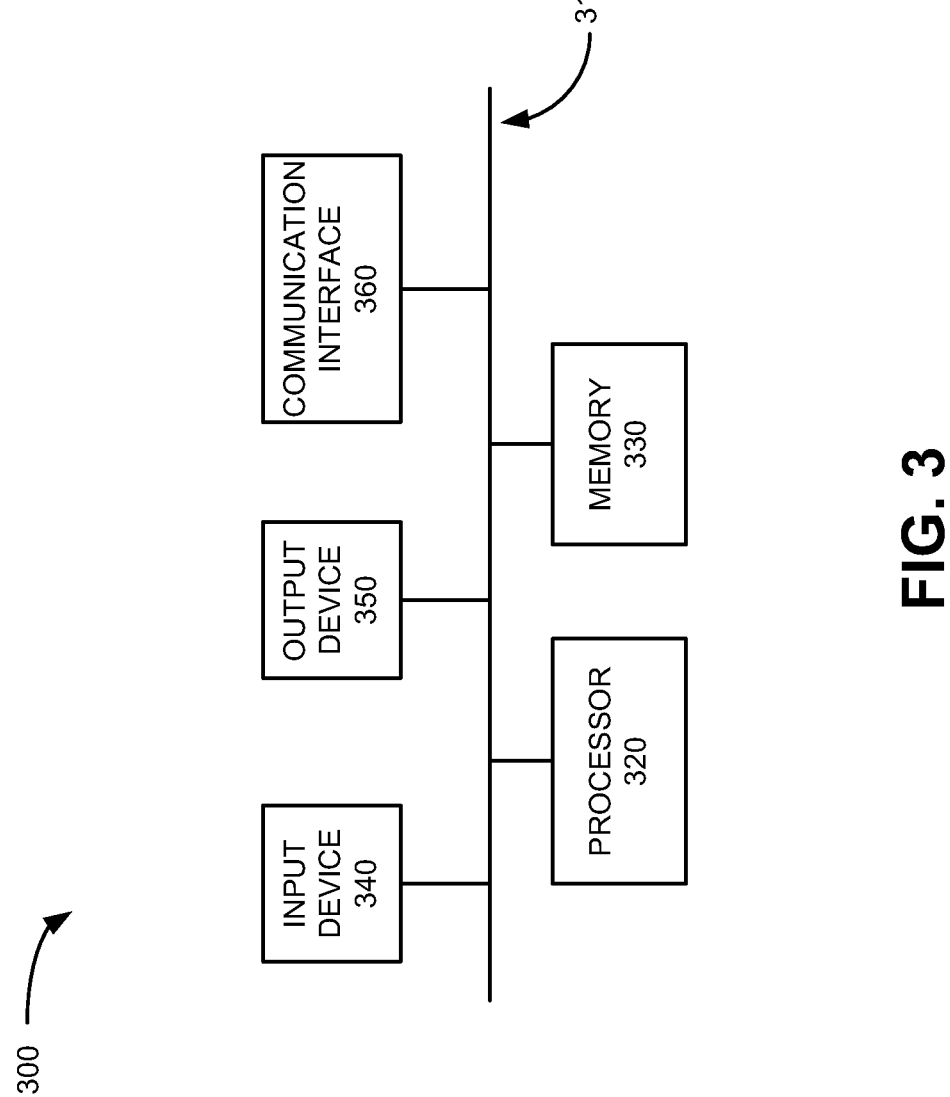
FIG. 3 illustrates logic components implemented in one or more of the devices illustrated in FIGS. 1 and 2 in accordance with an exemplary implementation.

FIG. 3 illustrates an exemplary configuration of a device 300. One or more devices 300 may correspond to or be implemented within various devices in environment 100, such as UE device 110, wireless station 122, RAN device 124, network devices 140, core device 142, and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3. Bus 310 may include communication paths between the components of device 300. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more RF transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
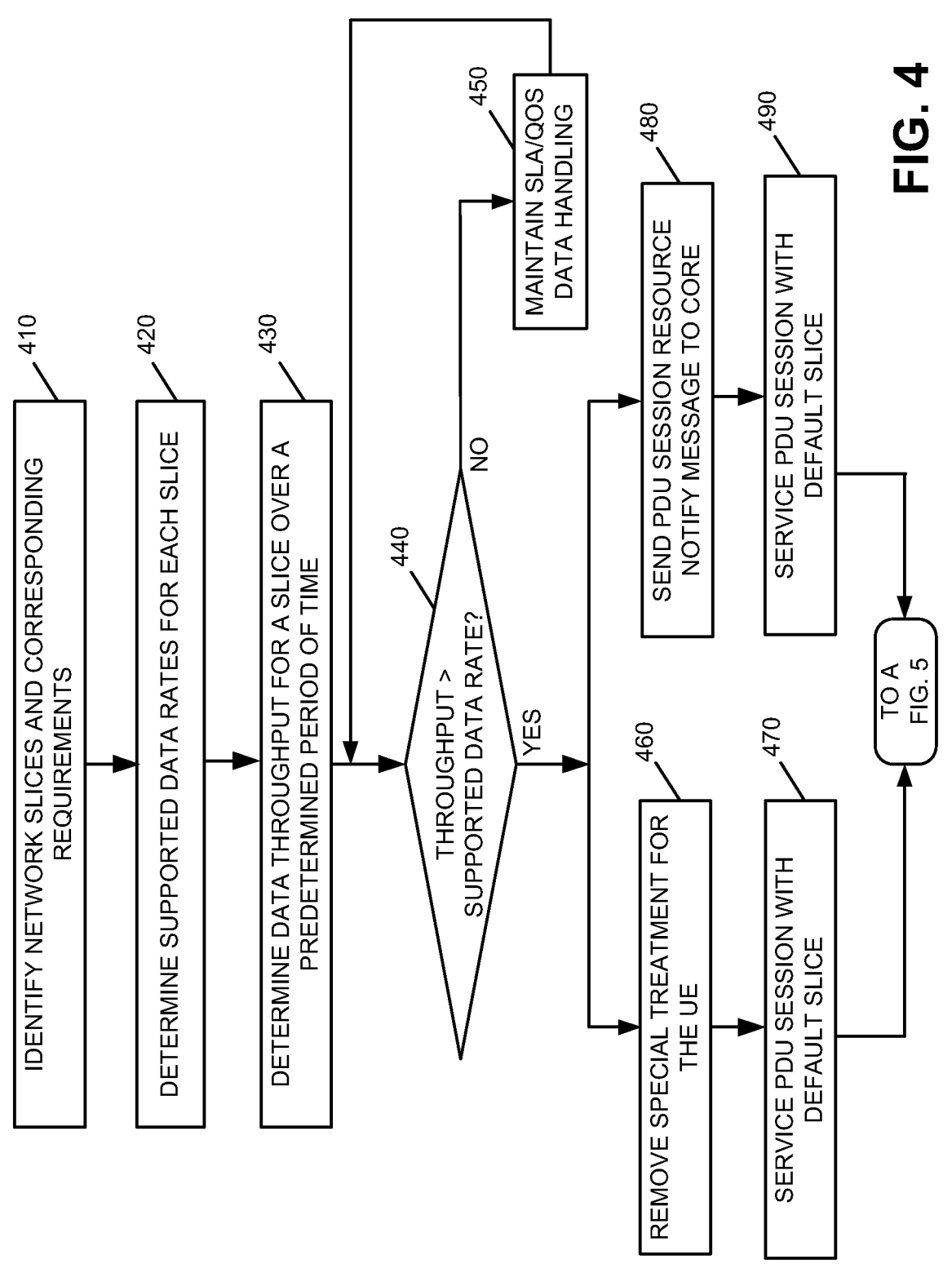
FIGS. 4 and 5 are flow diagrams illustrating processing associated with applying differentiated services to user devices in accordance with an exemplary implementation.
Figure 5:
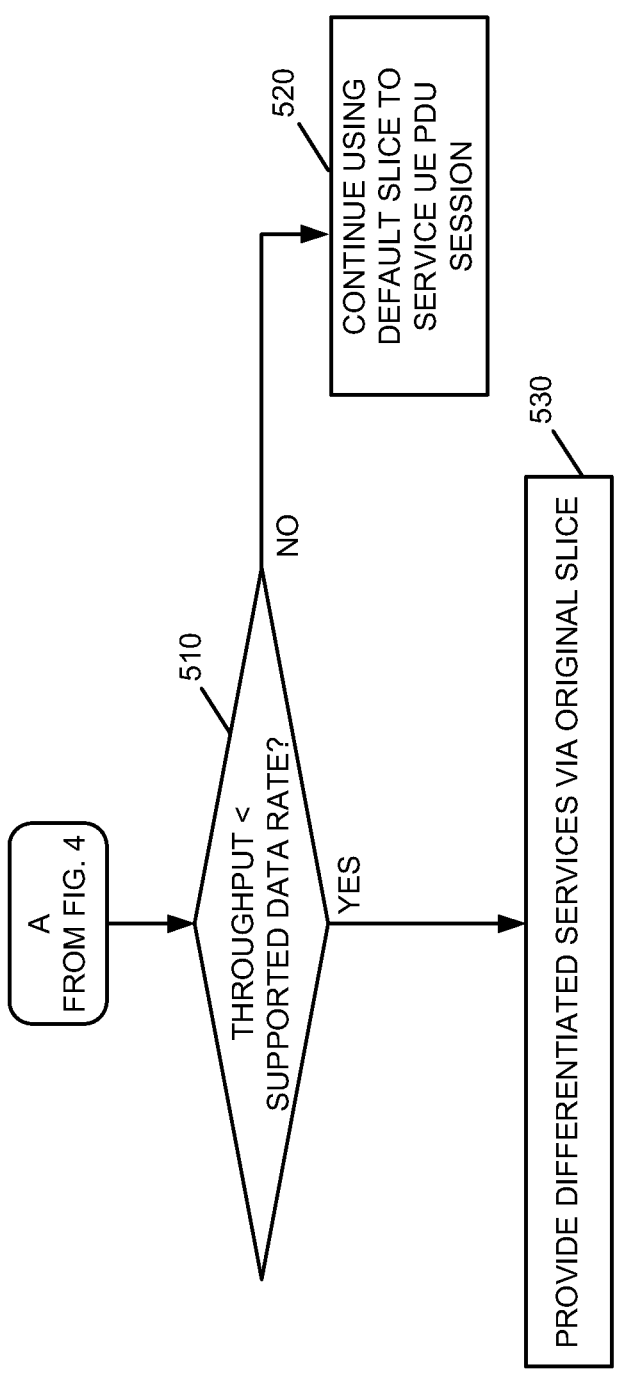

FIGS. 4 and 5 are flow diagrams illustrating processing associated with providing differentiated services via network slicing. Processing may begin with identifying network slices in environment 100 and their corresponding requirements (block 410). For example, as discussed above, network device 200 may store information in database 230 that identifies network slices and their associated network requirements, such as SLA and/or QoS requirements. As an example, one network slice may be associated with low latency and low jitter.

Device 200 may also determine traffic profile information associated with each slice, such as maximum supported data rates associated with each slice (block 420). For example, slices may have advertised profiles that include data rates that will be supported by the network slices. As an example, a particular slice may have downlink and uplink data throughput thresholds which are advertised as being supported by that particular slice, such as, for example, a downlink throughput of 10 megabits per second (Mb/s) and an uplink throughput of 2 Mb/s. The data profile, including supported data rates, may be stored in database 230.

Device 200 may determine the actual data throughput for a slice over a period of time (block 430). For example, device 200 may identify a time window of 5 seconds, 30 seconds, 1 minute, 2 minutes, etc. Data throughput monitor 220 may then determine the actual data throughput for the slice over the period of time. Device 200 may then determine whether the actual measured throughput for a particular UE 110 supported by the slice exceeds the advertised data rate for the slice (block 440). If the measured data throughput is not greater than the supported or advertised data rate (block 440—no), device 200 may maintain the differentiated services that is provided by the slice, such as the low latency and low jitter SLA (block 450). Processing may continue back to block 440 by periodically monitoring actual data throughput for UEs 110.

If, however, the measured data throughput for a particular UE 110 is greater than the advertised or supported data throughput/data rate, device 200 may remove special treatment for the particular UE 110 (block 460). For example, if RAN device 124 determines that the measured data throughput associated with UE 110-1 is greater than the advertised data throughput/rate, RAN device 124 may remove the special treatment or differentiated services for UE 110-1. For example, data traffic handler 250 of RAN device 124 may effectively remove the SLA, QoS and/or priority treatment and services for protocol data unit (PDU) sessions for UE 110-1 by signaling network devices 140 in core network 130, wireless stations 122 in RAN 120 and other devices in environment 100 to service the data session for UE 110-1 using a default slice, as opposed to the original slice with the low latency and low jitter SLA (block 470).

Alternatively, if the measured data throughput for a particular UE 110 is greater than the advertised or supported data throughput/rate, RAN device 124 may transmit a PDU session resource notify message to core network 130 to notify core network 130 that a particular UE 110 has exceeded the advertised data thresholds (block 480). For example, session resource notifier 240 may generate a message for transmission to core network 130 indicating that a particular UE 110 has experienced data throughput that is greater than the advertised threshold(s).

For example, session resource notifier 240 of RAN device 124 may send a message to core device 142 indicating that the data throughput threshold had been exceeded by UE 110-1. In this case, core network 130 may determine whether to change the SLA and/or QoS configuration for the user/supplication. For example, traffic handler 250 of core device 142 may determine that UE 110-1 is not to be supported by the original slice, but will be serviced by a default slice not having the low latency and low jitter SLA guarantee (block 490). Core device 142 may communicate the new slice assignment to various network functions (e.g., network devices 140) in core network 130 and RAN 120.

In either case (e.g., processing proceeding as described with respect to blocks 460 and 470 in FIG. 4 regarding RAN device 124 removing the differentiated services treatment associated with the original slice, or processing proceeding as described with respect to blocks 480 and 490 in FIG. 4 regarding core device 142 determining whether to remove the differentiated services treatment), processing may continue as described in FIG. 5. Referring to FIG. 5, data throughput monitor 220 may determine if the data throughput at a next periodic monitoring interval is less than the advertised or supported data throughput/rate (block 510). For example, data throughput monitor 220 of RAN device 124 may examine buffer status reports (BSRs) associated with UEs 110 over the period of time to determine an uplink throughput for particular UEs 110. The BSRs may be reported by UEs 110 to wireless stations 122 at regular intervals to allow the wireless stations 122 to schedule transmissions. Data throughput monitor 220 may monitor the BSRs over the period of time to determine the actual data throughput over that period of time. RAN device 124 may also monitor downlink throughput via wireless stations 122.

Alternatively, data throughput monitor 220 of core device 142 may determine the uplink and downlink throughput associated with UEs 110 by analyzing data traffic and traffic requests in environment 100. For example, data throughput monitor 220 of core device 142 may communicate with RAN device 124 to determine the data throughput associated with UEs 110, as well as communicate with network devices 140 to determine data throughput for particular UEs 110.

In each case, if the measured data throughput determined at the monitoring interval for a particular UE 110 is not less than the advertised thresholds (block 510—no), core network 130 and RAN 120 may continue using the default slice to service the PDU session for the UE 110 (block 520).

If, however, the demand determined at the monitoring interval is less than the advertised threshold (block 510—yes), traffic handler 250 may re-apply the differentiated services handling of data sessions for the UE 110 via the original network slice servicing UE 110 (block 530). For example, traffic handler 250 may signal network devices 140 and devices in RAN 120 to service PDU sessions for the UE 110 using the original network slice with the low latency and low jitter SLA.

RAN device 124 and core device 142 may continue to monitor actual data throughput and data demand at regular intervals on an ongoing basis. When the measured data throughput exceeds advertised thresholds, RAN device 124 and/or core device 142 may automatically modify the UE 110's data sessions to using a default network slice, or no slice at all. The change in network slices may also be performed in real time while a PDU session is ongoing or live. At a later time interval, if the measured data throughput for the UE 110 is less than the advertised thresholds, RAN device 124 and/or core device 142 may automatically and in real time, modify the UE 110's data session to service the data session using the original slice (e.g., the low latency and low jitter slice in this example). In this manner, UEs 110 may be provided with conditional differentiated services based on the particular UE demand.

Implementations described herein provide conditional differentiated services to UE devices 110, via network slices. When data throughput, demand or other factors associated with a particular UE device 110 exceed profile thresholds for the slice, the network may automatically provide services via a default slice, or no slice, to effectively remove the differentiated services treatment. The service provider may also continuously monitor data throughput at various intervals and re-apply the differentiated services/special treatment when the data throughput associated with the UE device 110 falls below the advertised supported data rate for the slice. This dynamic provisioning regarding differentiated services may allow for UE devices to receive requested services, while ensuring that other UE devices have adequate resources to service their data sessions.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with respect to elements of RAN 120 and/or core network 130 operating to determine whether to service a particular UE with an original slice or a default slice. In some implementations, elements of RAN 120 and core network 130 may work together to make the determination regarding which slice to use to support particular UEs 110. For example, RAN 120 and core network 130 may make the determination jointly based on possible resource congestion in RAN 120 and/or core network 130, along with actual data usage and demand associated with particular UEs 110.

In addition, features have been described with respect to elements in RAN 120 and core network 130 performing various determinations regarding the use of network slices. In other implementations, similar processing may be performed in other portions of environment 100, such as in a Multi-access Edge Computing (MEC) platform located, for example, between RAN 120 and core network 130.

Still further, implementations have been described above with respect to using a default network slice to service a data session when data usage/throughput for a particular UE 110 exceeds an advertised threshold. In other implementations, a service provider associated with environment 100 may service a UE 110 without using slices when a UE 110's throughput exceeds an advertised threshold. For example, a UE 110 may be serviced using general data services in RAN 120 and core network 130 without using any default slice to service UE 110's data sessions.

Further, while series of acts have been described with respect to FIGS. 4 and 5, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   providing data services to a user equipment (UE) device via a first network slice;
   determining a data throughput threshold associated with the first network slice;

determining if a data throughput for the UE device has exceeded the data throughput threshold over a first period of time based on buffer status reports associated with the UE device;

providing data services to the UE device via a second network slice, in response to determining that the data throughput for the UE device has exceeded the data throughput threshold over the first period of time, wherein the first network slice is configured to provide differentiated data services to the UE device and the second network slice is configured to not provide differentiated data services to the UE device; and continuing to provide data services to the UE device via the second network slice in response to determining that data throughput for the UE device exceeds the data throughput threshold.

2. The method of claim 1, wherein the first network slice is configured to provide differentiated data services to the UE device based on at least one of a service level agreement (SLA) or quality of service (QoS) requirement and wherein the second network slice corresponds to a default network slice configured to not provide data services to the UE device associated with the at least one of the SLA or QoS requirement.

3. The method of claim 1, wherein the providing data services to the UE device via the second network slice comprises:

identifying whether at least one of a download throughput for the UE device or an upload throughput for the UE device based on the buffer status reports associated with the UE device indicates that the data throughput for the UE device exceeds at least one of an uplink or downlink throughput threshold; and wherein the continuing to provide data services to the UE device via the second network slice comprises:

continuing to provide data services via the second network slice in response to determining that data throughput for the UE device exceeds at least one of the uplink or downlink throughput threshold.

4. The method of claim 3, further comprising:

providing data services to the UE device via the first network slice in response to determining that data throughput associated with the UE device does not exceed the at least one of the uplink or downlink throughput threshold.

5. The method of claim 1, further comprising:

transmitting, by a device in a radio access network servicing the UE device, a notification message to a core network, wherein the notification message indicates that the data throughput for the UE device has exceeded the data throughput threshold over the first period of time.

6. The method of claim 5, further comprising:

determining, by the core network and in response to receiving the notification message, to service the UE device via the second network slice.

7. The method of claim 1, further comprising:

periodically monitoring the data throughput for the UE device to determine whether the data throughput associated with the UE device exceeds the data throughput threshold.

8. The method of claim 7, further comprising:

resuming the providing of data services to the UE device via the first network slice, in response to determining that the data throughput associated with the UE device does not exceed the data throughput threshold.

9. The method of claim 1, wherein providing data services via the second network slice comprises:

determining, by at least one of a RAN device or a core network device, whether to provide data services via the second network slice based on a data profile associated with the first network slice.

10. A system, comprising:

a radio access network (RAN); and a core network, wherein at least one device in at least one of the RAN or the core network is configured to:

provide data services to a user equipment (UE) device via a first network slice, determine a data throughput threshold associated with the first network slice, determine if a data throughput for the UE device has exceeded the data throughput threshold over a first period of time, provide data services to the UE device via a second network slice, in response to determining that the data throughput for the UE device has exceeded the data throughput threshold over the first period of time, wherein the first network slice is configured to provide differentiated data services to the UE device and the second network slice is configured to not provide differentiated data services to the UE device; and continue to provide data services to the UE device via the second network slice in response to determining that the data throughput for the UE device exceeds the data throughput threshold.

11. The system of claim 10, wherein the first network slice is configured to provide differentiated data services to the UE device based on at least one of a service level agreement (SLA) or quality of service (QoS) requirement and wherein the second network slice corresponds to a default network slice configured to not provide data services to the UE device associated with the at least one of the SLA or QoS requirement.

12. The system of claim 10, wherein when providing data services to the UE device via the second network slice, the at least one device is configured to:

identify whether at least one of a download data throughput or an upload data throughput for the UE device indicates that the data throughput for the UE device exceeds at least one of an uplink or downlink throughput threshold, and wherein when continuing to provide data services to the UE device via the second network slice, the at least one device is configured to:

continue to provide data services via the second network slice in response to determining that the data throughput for the UE device exceeds the at least one of the uplink or downlink throughput threshold.

13. The system of claim 12, wherein the at least one device is further configured to:

provide data services to the UE device via the first network slice in response to determining that the data throughput associated with the UE device does not exceed the at least one of the uplink or downlink throughput threshold.

14. The system of claim 10, wherein the at least one device comprises a RAN device and a core network device, wherein the RAN device is configured to transmit a notification message to the core network device, wherein the notification message indicates that the data throughput for the UE device has exceeded the data throughput threshold over the first period of time.

15. The system of claim 14, wherein the core network device is configured to:

determine, in response to receiving the notification message, to service the UE device via the second network slice.

16. The system of claim 10, wherein the at least one device is configured to:

periodically monitor the data throughput for the UE device to determine whether the data throughput associated with the UE device exceeds the data throughput threshold.

17. The system of claim 16, wherein the at least one device is configured to:

signal devices in at least one of the RAN or core network to resume the providing of data services to the UE device via the first network slice, in response to determining that the data throughput associated with the UE device does not exceed the data throughput threshold.

18. A non-transitory computer-readable medium having stored thereon sequences of instructions which, when executed by at least one processor, cause the at least one processor to:

determine a data throughput threshold associated with a first network slice;

determine if a data throughput for a user equipment (UE) device has exceeded the data throughput threshold over a first period of time; and signal at least one device in at least one of a radio access network (RAN) or a core network to provide data services to the UE device via a second network slice, in response to determining that the data throughput for the UE device has exceeded the data throughput threshold over the first period of time, wherein the first network slice is configured to provide differentiated data services to the UE device and the second network slice is configured to not provide differentiated data services to the UE device; and signal the at least one device to continue to provide data services to the UE device via the second network slice in response to determining that the data throughput for the UE device exceeds the data throughput threshold.

19. The non-transitory computer-readable medium of claim 18, wherein the instructions further cause the at least one processor to:

identify whether at least one of a download data throughput or an upload data throughput for the UE device indicates that the data throughput for the UE devices exceeds at least one of an uplink or downlink throughput threshold; and wherein when signaling the at least one device to continue to provided data services to the UE device via the second network slice, the at least one processor is configured to:

signal the at least one device to continue to provide data services via the second network slice in response to determining that the data throughput associated with the UE device exceeds the at least one of uplink or downlink throughput threshold.

20. The non-transitory computer-readable medium of claim 18, wherein the instructions further cause the at least one processor to:

periodically monitor the data throughput for the UE device to determine whether the data throughput associated with the UE device exceeds the data throughput threshold; and signal the at least one device to resume providing data services to the UE device via the first network slice, in response to determining that the data throughput associated with the UE device does not exceed the data throughput threshold.

\* \* \* \* \*